United States Patent
Wilber et al.

(10) Patent No.: US 10,202,858 B2
(45) Date of Patent: Feb. 12, 2019

(54) RECONFIGURING A STATOR VANE STRUCTURE OF A TURBINE ENGINE

(71) Applicant: United Technologies Corporation, Hartford, CT (US)

(72) Inventors: John E. Wilber, East Hampton, CT (US); Kirk S. Hunte, Hartford, CT (US); Matthew R. King, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 376 days.

(21) Appl. No.: 14/966,846

(22) Filed: Dec. 11, 2015

(65) Prior Publication Data
US 2017/0167281 A1 Jun. 15, 2017

(51) Int. Cl.
*F01D 9/04* (2006.01)
*F01D 5/06* (2006.01)

(52) U.S. Cl.
CPC ............. *F01D 9/041* (2013.01); *F01D 5/06* (2013.01); *F05D 2220/30* (2013.01); *F05D 2230/60* (2013.01); *F05D 2230/70* (2013.01); *F05D 2230/80* (2013.01); *F05D 2260/80* (2013.01); *Y02T 50/673* (2013.01)

(58) Field of Classification Search
CPC ..... F01D 9/00; F01D 9/02; F01D 9/04; F01D 9/041; F01D 5/06; F01D 25/24; F01D 25/246; F05D 2230/60; F05D 2230/70; F05D 25/24; F05D 25/246; F05D 2240/10; F05D 2240/12; F05D 2240/128; F05D 2240/1281; G02B 23/2492
See application file for complete search history.

(56) References Cited

U.S. PATENT DOCUMENTS

| 4,470,735 | A  | 9/1984  | Salisbury |
| 8,196,934 | B2 | 6/2012  | Do |
| 8,388,306 | B2 | 3/2013  | Somanath et al. |
| 8,517,686 | B2 | 8/2013  | Allen-Bradley et al. |
| 8,561,414 | B1 | 10/2013 | Praisner et al. |
| 8,776,533 | B2 | 7/2014  | Feindel et al. |
| 8,863,531 | B2 | 10/2014 | Scott et al. |
| 8,915,090 | B2 | 12/2014 | Praisner et al. |
| 2005/0053457 | A1* | 3/2005 | Fadok ............ F01D 9/041 415/1 |
| 2006/0222482 | A1* | 10/2006 | Jacks ............ F01D 9/041 415/1 |
| 2013/0259646 | A1* | 10/2013 | Feindel .......... F01D 21/003 415/118 |

(Continued)

FOREIGN PATENT DOCUMENTS

WO WO 2014189579 A2 * 11/2014 ............ F02C 7/20

OTHER PUBLICATIONS

Extended European Search Report dated Apr. 13, 2017.

*Primary Examiner* — Logan Kraft
*Assistant Examiner* — Elton Wong
(74) *Attorney, Agent, or Firm* — O'Shea Getz P.C.

(57) ABSTRACT

A turbine engine assembly and methods involving a turbine engine assembly are provided. In one method, the turbine engine assembly is received. The turbine engine assembly includes an annular stator vane structure disposed at a first orientation. The stator vane structure is reconfigured with the turbine engine assembly to be disposed at a second orientation.

13 Claims, 9 Drawing Sheets

(56) References Cited

U.S. PATENT DOCUMENTS

| | | |
|---|---|---|
| 2014/0043368 A1 | 2/2014 | Yu |
| 2014/0186168 A1 | 7/2014 | Chuong et al. |
| 2014/0318141 A1 | 10/2014 | Bartz et al. |
| 2014/0334916 A1 | 11/2014 | Snyder et al. |
| 2016/0032778 A1 | 2/2016 | Sanchez |

* cited by examiner

RECONFIGURING A STATOR VANE STRUCTURE OF A TURBINE ENGINE

BACKGROUND OF THE INVENTION

1. Technical Field

This disclosure relates generally to a method for working on an assembly for a turbine engine.

2. Background Information

A turbine engine may include a stator vane structure between a high pressure turbine (HPT) rotor and a low pressure turbine (LPT) rotor. During engine operation, thermal hot spots within core gas flowing through the stator vane structure may subject one or more portions of the stator vane structure to higher concentrations of thermal stresses and degradation. During overhaul/maintenance of the turbine engine, this unevenly stressed and degraded stator vane structure may be replaced with a new stator vane structure to ensure that this component can withstand the higher concentrations of thermal stresses and degradation during future turbine engine operation. Such a replacement stator vane structure, however, is typically expensive and thereby may significantly increase turbine engine overhaul/maintenance costs.

There is a need in the art for an improved method of overhauling/maintaining a turbine engine.

SUMMARY OF THE DISCLOSURE

According to an aspect of the present disclosure, a method is provided involving a turbine engine assembly. The method includes receiving the turbine engine assembly, where the turbine engine assembly includes an annular stator vane structure disposed at a first orientation. The method also includes reconfiguring the stator vane structure with the turbine engine assembly to be disposed at a second orientation.

According to another aspect of the present disclosure, a method is provided for overhauling a turbine engine assembly. During this method, the turbine engine assembly is received. This turbine engine assembly extends along an axial centerline and includes a first set of turbine blades, a second set of turbine blades and an annular stator vane structure. The stator vane structure is axially between the first set of turbine blades and the second set of turbine blades and disposed at a first orientation. The turbine engine assembly is disassembled to remove the stator vane structure. The stator vane structure is reconfigured to provide a reconfigured stator vane structure. This reconfiguring includes: plugging a first aperture that extends radially through an outer platform of the stator vane structure; and forming a second aperture radially through the outer platform, where the second aperture is angularly displaced about the axial centerline from the plugged first aperture by an angular displacement. The turbine engine assembly is assembled to install the reconfigured stator vane structure. The reconfigured stator vane structure is disposed at a second orientation which is angularly displaced about the axial centerline from the first orientation by the angular displacement.

According to still another aspect of the present disclosure, an assembly is provided for a turbine engine. This turbine engine assembly includes an annular stator vane structure, a plug and a borescope plug. The stator vane structure includes an outer platform, an inner platform and an array of stator vanes. The stator vanes extend radially between the outer platform and the inner platform. A first aperture extends radially through the outer platform. A second aperture extends radially through the outer platform. The plug is disposed within and fluidly plugs the first aperture. The plug is fixedly attached to the outer platform. The borescope plug is disposed within and fluidly plugs the second aperture. The borescope plug is removably attached to the outer platform.

A first turbine rotor and/or a second turbine rotor may be included. The stator vane structure may be arranged between the first turbine rotor and the second turbine rotor.

The plug may be attached to the outer platform by at least a bond joint. The plug may also or alternatively be attached to the outer platform by at least an interference fit.

The outer platform may have a flow surface that partially forms a gas path through the stator vane structure. An inner end of the plug may be radially recessed into the outer platform from the flow surface.

The second orientation may be angularly displaced about an axial centerline of the turbine engine assembly from the first orientation by between about five degrees and about one-hundred and eighty degrees.

The stator vane structure may include a plurality of bosses, which are substantially uniformly disposed circumferentially about an axial centerline of the turbine engine assembly. Each adjacent pair of the bosses may be separated by an angular displacement increment about the axial centerline. The second orientation may be angularly displaced about the axial centerline from the first orientation by a multiple of the angular displacement increment.

The second orientation may be angularly displaced about an axial centerline of the turbine engine assembly from the first orientation to change a hot spot location on the stator vane structure.

The turbine engine assembly may include a first turbine rotor and a second turbine rotor. The stator vane structure may be arranged between the first turbine rotor and the second turbine rotor.

The reconfiguring of the stator vane structure may include: disassembling the turbine engine assembly to remove the stator vane structure; rotationally clocking the stator vane structure from the first orientation to the second orientation to provide a clocked stator vane structure; and assembling the turbine engine assembly to install the clocked stator vane structure.

The reconfiguring of the stator vane structure may include reconditioning at least a portion of the stator vane structure.

The reconfiguring of the stator vane structure may include plugging an aperture which extends radially through a platform of the stator vane structure.

The plugging may include inserting a plug into the aperture and attaching the plug to the platform by at least an interference fit. In addition or alternatively, the plugging may include inserting a plug into the aperture and attaching the plug to the platform by at least a bond joint.

The plugging may include inserting a plug into the aperture and attaching the plug to the platform. A flow surface of the plug may be radially recessed from a corresponding flow surface of the platform. The flow surface of the platform may partially form a gas path through the stator vane structure.

The aperture may be surrounded by a boss. The reconfiguring of the stator vane structure may include mating a bushing with the boss. The assembling of the turbine engine assembly may include inserting a retaining pin into the bushing radially outboard of the plug.

The reconfiguring of the stator vane structure may include forming an aperture radially through a platform of the stator vane structure.

The assembling of the turbine engine assembly may include inserting a borescope plug into the aperture.

The foregoing features and the operation of the invention will become more apparent in light of the following description and the accompanying drawings.

DETAILED DESCRIPTION OF THE INVENTION

Figure 1:
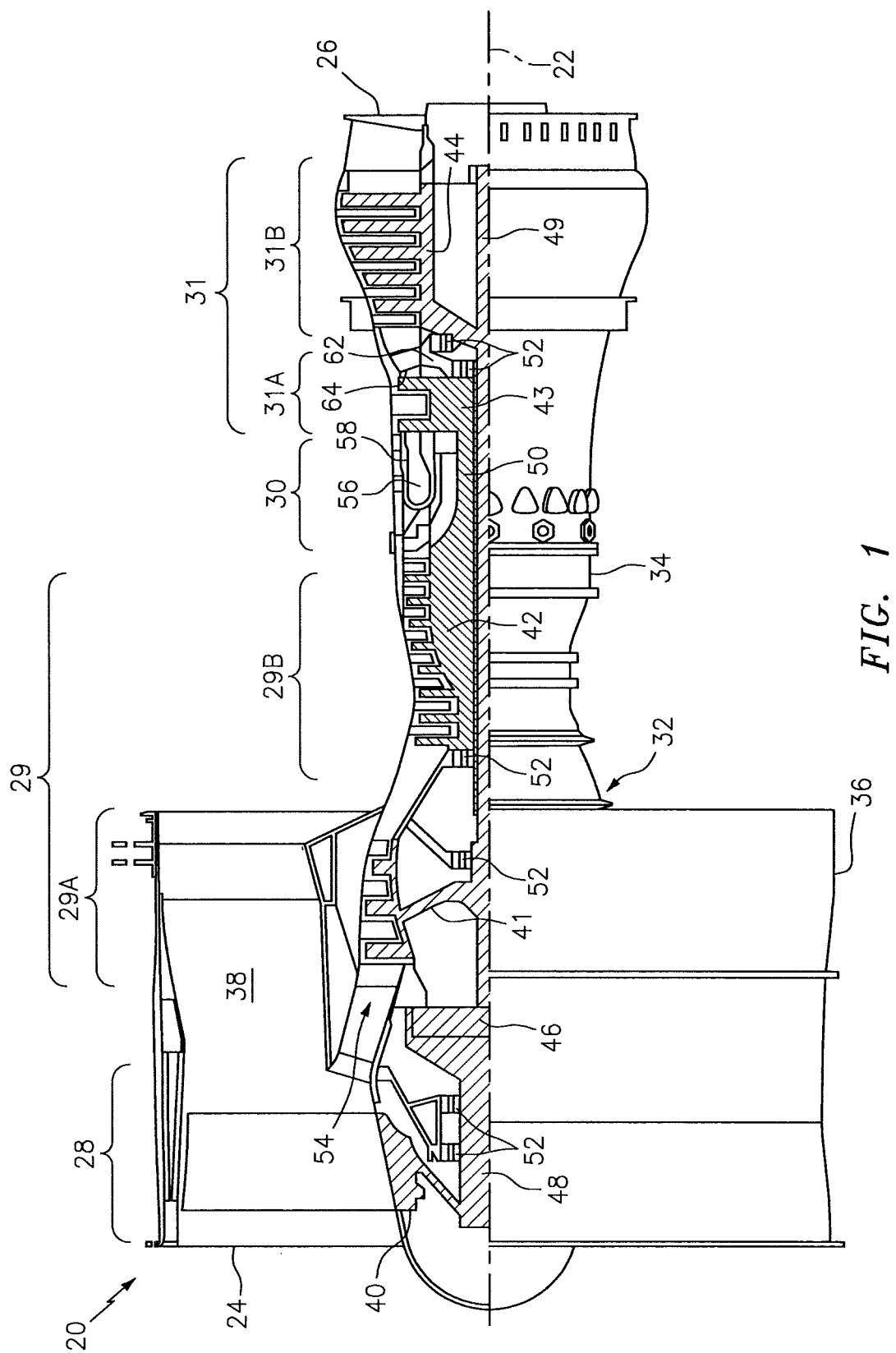
FIG. 1 is a side cutaway illustration of a geared turbine engine.

FIG. 1 is a side cutaway illustration of a geared turbine engine 20. This turbine engine 20 extends along an axial centerline 22 between an upstream airflow inlet 24 and a downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28, 29A, 29B, 30, 31A and 31B are arranged sequentially along the centerline 22 within an engine housing 32. This housing includes an inner case 34 (e.g., a core case) and an outer case 36 (e.g., a fan case). The inner case 34 may house one or more of the engine sections 29-31; e.g., an engine core. The outer case 36 may house at least the fan section 28. The engine housing 32 also includes an inner nacelle and an outer nacelle (not shown). The inner nacelle houses and provides an aerodynamic cover for the inner case 34. The outer nacelle houses and provides an aerodynamic cover the outer case 36. The outer nacelle also overlaps a portion of the inner nacelle thereby defining a bypass gas path 38 radially between the nacelles. This bypass gas path 38 is also defined between the inner case 34 and the outer case 36.

Each of the engine sections 28, 29A, 29B, 31A and 31B includes a respective rotor 40-44. Each of these rotors 40-44 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s). The rotor blades may be arranged in one or more sets/arrays to provide that respective engine section with one or more stages.

The fan rotor 40 is connected to a gear train 46, for example, through a fan shaft 48. The gear train 46 and the LPC rotor 41 are connected to and driven by the LPT rotor 44 through a low speed shaft 49. The HPC rotor 42 is connected to and driven by the HPT rotor 43 through a high speed shaft 50. The shafts 48-50 are rotatably supported by a plurality of bearings 52; e.g., rolling element and/or thrust bearings. Each of these bearings 52 is connected to the engine housing 32 by at least one stationary structure such as, for example, an annular support strut.

During operation, air enters the turbine engine 20 through the airflow inlet 24. This air is directed through the fan section 28 and into a core gas path 54 and the bypass gas path 38. The core gas path 54 extends sequentially through the engine sections 29-31. The air within the core gas path 54 may be referred to as "core air". The air within the bypass gas path 38 may be referred to as "bypass air".

The core air is compressed by the compressor rotors 41 and 42 and directed into a combustion chamber 56 of a combustor 58 in the combustor section 30. Fuel is injected into the combustion chamber 56 and mixed with the compressed core air to provide a fuel-air mixture. This fuel air mixture is ignited and combustion products thereof flow through and sequentially cause the turbine rotors 43 and 44 to rotate. The rotation of the turbine rotors 43 and 44 respectively drive rotation of the compressor rotors 42 and 41 and, thus, compression of the air received from the fan section 28. The rotation of the turbine rotor 44 also drives rotation of the fan rotor 40, which propels bypass air through and out of the bypass gas path 38. The propulsion of the bypass air may account for a majority of thrust generated by the turbine engine 20, e.g., more than seventy-five percent (75%) of engine thrust. The turbine engine 20 of the present disclosure, however, is not limited to the foregoing exemplary thrust ratio.

Figure 2:
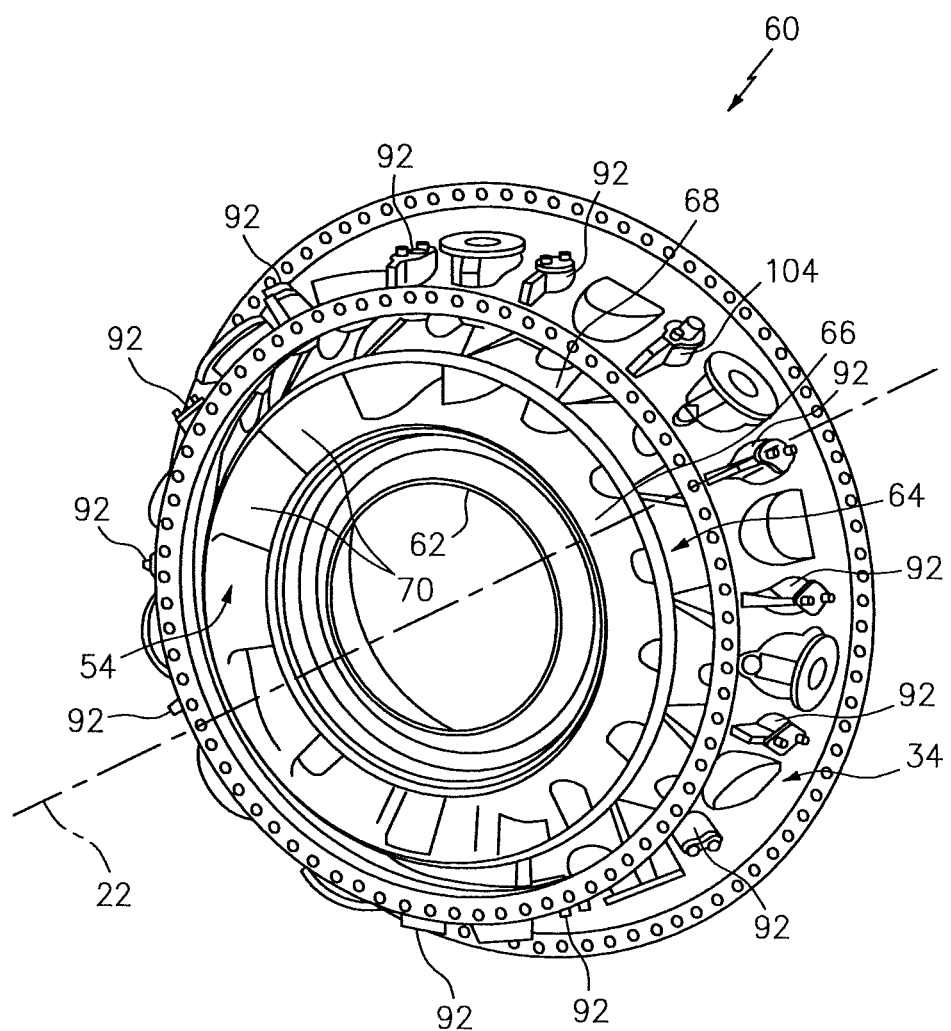
FIG. 2 is a perspective illustration of a turbine engine assembly which includes a stator vane structure.

FIG. 2 illustrates an assembly 60 for the turbine engine 20. This turbine engine assembly 60 includes the inner case 34 and a stationary structure 62, which may be configured as a bearing support structure such as a mid-turbine frame structure (see FIG. 1). The turbine engine assembly 60 also includes an annular stator vane structure 64, which may be arranged axially and fluidly between a first rotor (e.g., the HPT rotor 43) and a second rotor (e.g., the LPT rotor 44) as shown in FIG. 1. More particularly, in the embodiment of FIG. 1, the stator vane structure 64 is arranged axially and forms a portion of the core gas path 54 between a set (stage) of the HPT rotor 43 blades and a set (stage) of the LPT rotor 44 blades. However, the present disclosure is not limited to the foregoing stator vane structure arrangement. For example, in other embodiments, the stator vane structure 64 may be arranged in or between other sections 28-31 of the turbine engine 20.

Figure 3:
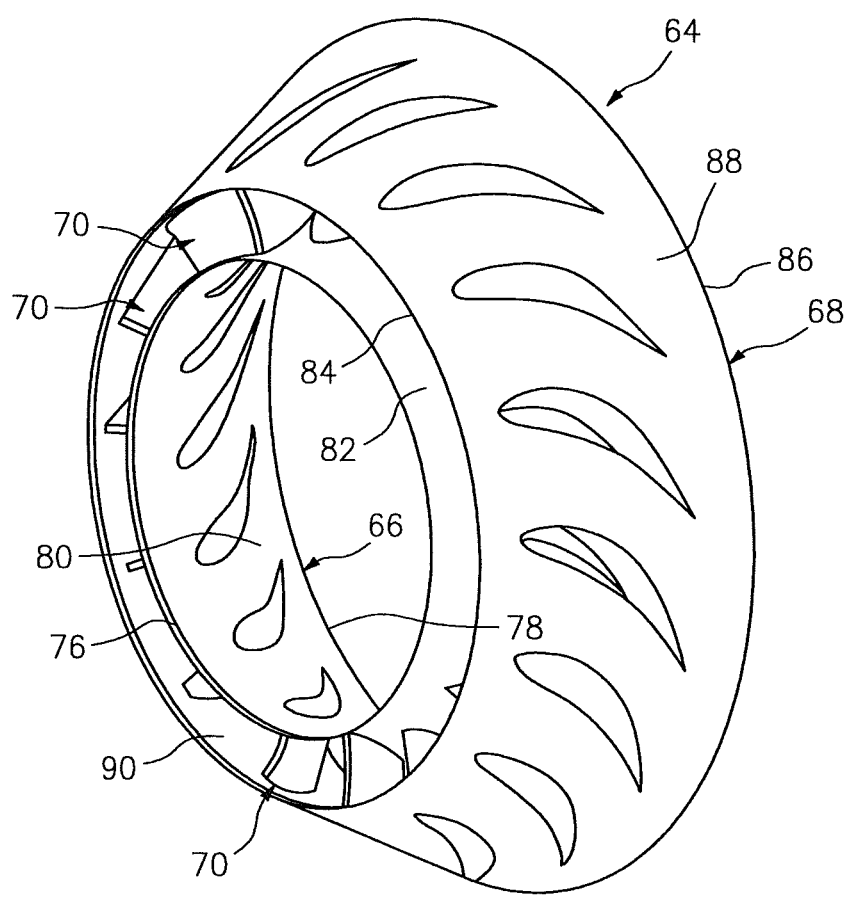
FIG. 3 is a perspective illustration of the stator vane structure.

Referring to FIG. 3, the stator vane structure 64 includes an inner platform 66, an outer platform 68 and a plurality of fixed stator vanes 70. The stator vane structure 64 also includes additional features such as mounting bosses 72 and a borescope boss 74, which are respectively described below with references to FIGS. 4 and 5. Such additional features, however, are not shown in FIG. 3 for ease of illustration.

Referring to FIG. 3, the inner platform 66 has a generally conical, tubular body. More particularly, the inner platform 66 extends circumferentially around the centerline. The inner platform 66 extends longitudinally (e.g., axially) between an upstream end 76 and a downstream end 78. The inner platform 66 extends depthwise (e.g., radially) between an inner surface 80 and an outer flow surface 82, which partially forms a radial inner periphery of the core gas path 54 through the stator vane structure 64.

The outer platform 68 has a generally conical, tubular body. More particularly, the outer platform 68 extends circumferentially around the centerline. The outer platform 68 extends longitudinally (e.g., axially) between an upstream end 84 and a downstream end 86. The outer platform 68 extends depthwise (e.g., radially) between an outer surface 88 and an inner flow surface 90, which partially forms a radial outer periphery of the core gas path 54 through the stator vane structure 64.

The stator vanes 70 are circumferentially disposed about the centerline in a circular array. These stator vanes 70 are arranged and extend depthwise (e.g., radially) between the inner platform 66 and the outer platform 68. One or more of these stator vanes 70 may each be configured as a hollow stator vane. In this manner, struts, fluid conduits and/or electrical conduits may be passed radially through the stator vane structure 64 into an interior portion of the turbine engine core without being directly subjected to the core gas flowing through the core gas path 54. The stator vane structure 64 of the present disclosure, however, is not limited to such an exemplary hollow stator vane configuration.

The stator vane structure 64 shown in FIG. 3 is formed as a unitary, full hoop body. The inner platform 66 and the outer platform 68, for example, may each be formed as a unitary, full hoop body. Each of the stator vanes 70 may also be fixedly connected to the inner platform 66 and the outer platform 68. Such a unitary, full hoop body may be formed by attaching components together. For example, arcuate segments of the stator vane structure 64 (e.g., singlets, doublets, etc.) may be mechanically fastened and/or bonded (e.g., welded, brazed, adhered, etc.) together. Alternatively, such a unitary, full hoop body may be formed as an integral, monolithic body via, for example, casting, machining, additive manufacturing, etc. The stator vane structure 64 of the present disclosure, however, is not limited to such a unitary, full hoop body configuration. For example, in other embodiments, the stator vane structure 64 may include a plurality of arcuate segments which are arranged together when assembled with the turbine engine 20.

Figure 4:
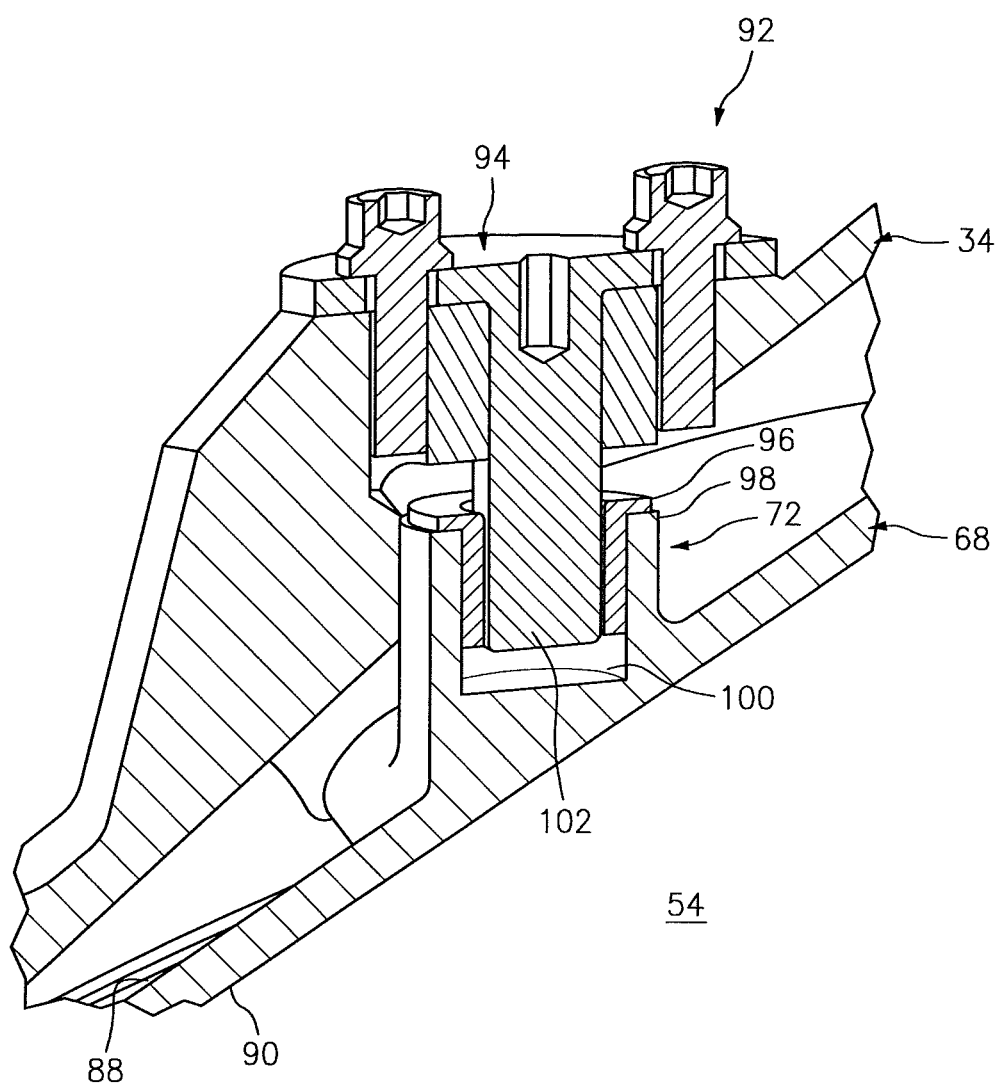
FIG. 4 is a perspective, side sectional illustration of connection between a case and the stator vane structure.

Referring to FIGS. 2 and 4, the stator vane structure 64 may be retained within the turbine engine assembly 60 by a plurality of mounts 92. These mounts 92 are circumferentially disposed about the centerline 22 in a circular array. Each of these mounts 92 includes a respective one of the mounting bosses 72 and a fastening device 94. Each of the mounts 92 may also include a bushing 96 and/or another feature or features such as a seal (now shown).

Referring to FIG. 4, each mounting boss 72 is connected (e.g., formed integral with or attached) to the outer platform 68 at a discrete circumferential position. This circumferential position may be located circumferentially between an adjacent pair of the stator vanes 70 (see FIG. 2); e.g., about circumferentially midway between those stator vanes 70.

Each mounting boss 72 extends generally radially out from the outer platform 68 and its outer surface 88 to a distal end 98. A bore 100 extends generally radially into each mounting boss 72 from the distal end 98. This bore 100 may extend substantially completely radially through the mounting boss 72 as shown in FIG. 4. Alternatively, the bore 100 may extend partially radially into the mounting boss 72, or completely radially through the mounting boss 72 and partially into the outer platform 68.

The bushing 96 is seated within the bore 100 and mated with the mounting boss 72 at its distal end 98. The fastening device 94 is configured with a pin 102 (e.g., a cylindrical projection), which extends radially inward from the inner case 34 and projects radially into or through the bushing 96. The fastening device 94 may project radially through a respective aperture in the inner case 34. The fastening device 94 may be attached to the inner case 34 by one or more fasteners; e.g., screws, bolts, rivets, etc.

The foregoing retainment scheme is configured, to allow the stator vane structure 64 to be axially and rotatably fixed relative to the inner case 34 and the stationary structure 62. This retainment scheme, however, is also configured to allow the stator vane structure 64 to thermally grow/contract relatively independent of the inner case 34 and/or the stationary structure 62. In this manner, the stator vane structure 64 may radially shift relative to the inner case 34 and/or the stationary structure 62. More particularly, the bushings 96 may slide radially along the pins 102.

Figure 5:
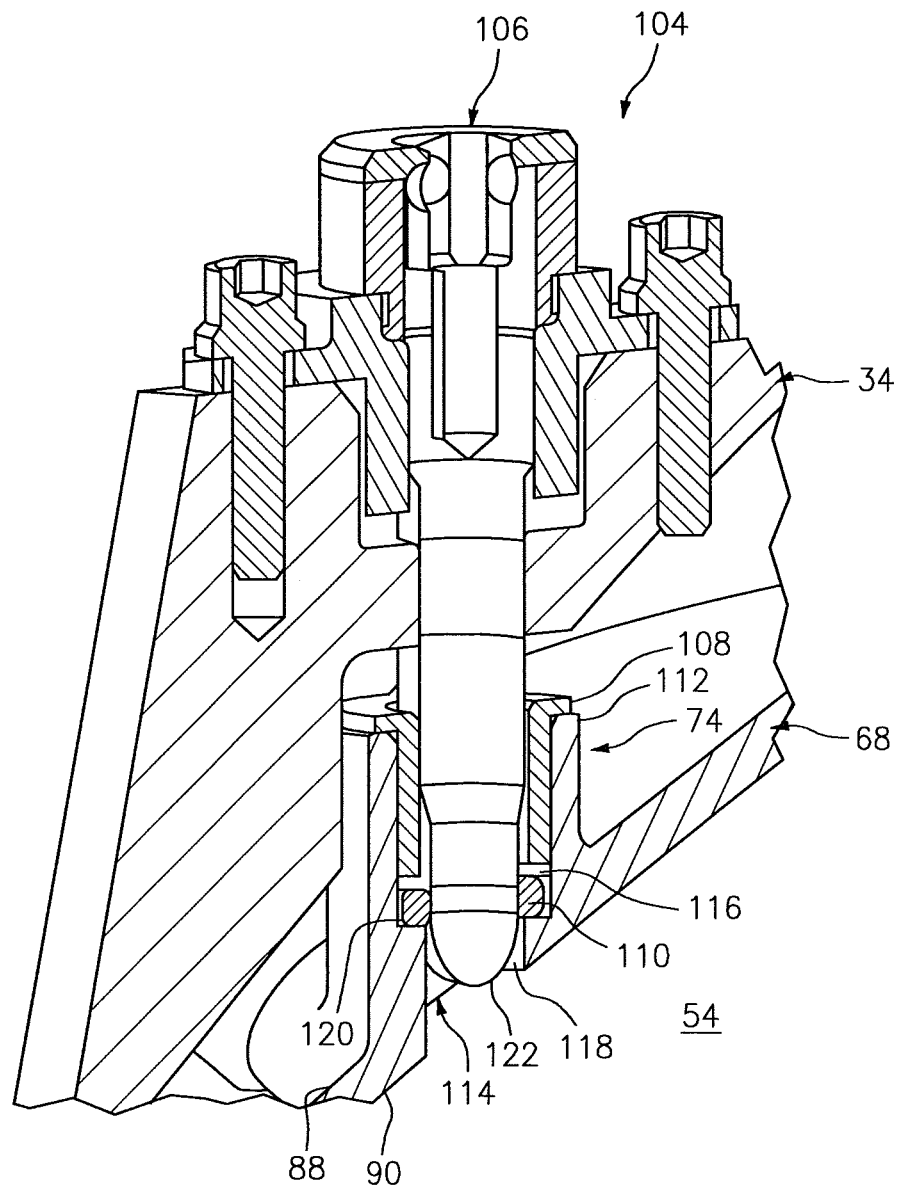
FIG. 5 is a perspective, side sectional illustration of a borescope plug mated with the case and the stator vane structure.

Referring to FIGS. 2 and 5, a borescope plug assembly 104 is disposed circumferentially between a pair of adjacent mounts 92. In the embodiment of FIG. 2, the borescope plug assembly 104 and the mounts 92 are uniformly circumferentially disposed; i.e., each element 92, 104 is located a prescribed circumferential distance from another adjacent element 92 or 104. The borescope plug assembly 104 includes the borescope boss 74 and a borescope plug 106. The borescope plug assembly 104 may also include a bushing 108 and/or a seal 110.

The borescope boss 74 is connected (e.g., formed integral with or attached) to the outer platform 68 at a discrete circumferential position. This circumferential position may be located circumferentially between an adjacent pair of the stator vanes 70; e.g., about circumferentially midway between those stator vanes 70. The borescope boss 74 extends generally radially out from the outer platform 68 and its outer surface 88 to a distal end 112. A bore 114 extends generally radially into the borescope boss 74 from the distal end 112. This bore 114 extends completely radially through the borescope boss 74 and the outer platform 68 as shown in FIG. 5. In this manner, the bore 114 is fluidly coupled with a portion of the core gas path 54 between two adjacent stator vanes 70 (see FIG. 2). This bore 114 includes an aperture 116 (through-hole) formed by the borescope boss 74 and an aligned aperture 118 (through-hole) formed by the outer platform 68.

The seal 110 is seated within the bore 114, for example, against an annular shelf 120 approximately at an intersection/transition between the borescope boss 74 and the outer platform 68. The bushing 108 is then seated within the bore 114 and mated with the borescope boss 74 at its distal end 112. The borescope plug 106 is configured with a pin 122 (e.g., a cylindrical projection), which extends radially inward from the inner case 34 and projects radially through the bushing 108 and into or through the seal 110. The borescope plug 106 may project radially through a respective aperture in the inner case 34. The borescope plug 106 may be attached to the inner case 34 by one or more fasteners; e.g., screws, bolts, rivets, etc.

During turbine engine 20 operation, the core air flowing from the HPT section 31A to the LPT section 31B may have circumferential hot spots; e.g., localized regions with elevated temperatures. Such hot spots can thermally stress and/or degrade corresponding circumferential portions of the stator vane structure 64 more than other (e.g., neighboring) portions of the stator vane structure 64. Such thermal stress and/or degradation may require replacement of the stator vane structure 64 during engine overhaul/maintenance with a new stator vane structure. However, such a stator vane structure may be expensive to manufacture and, thus, greatly increase the cost of engine overhaul/maintenance. Therefore, in order to reduce the cost of engine overhaul/maintenance, the present disclosure includes a method (see FIG. 6) for reconfiguring an existing stator vane structure, where that structure is angularly displaced (e.g., rotationally clocked) about the centerline 22 such that the circumferential core air hot spots are aligned with different (e.g., non-previously hot spot degraded) circumferential portions of the stator vane structure.

Figure 6:
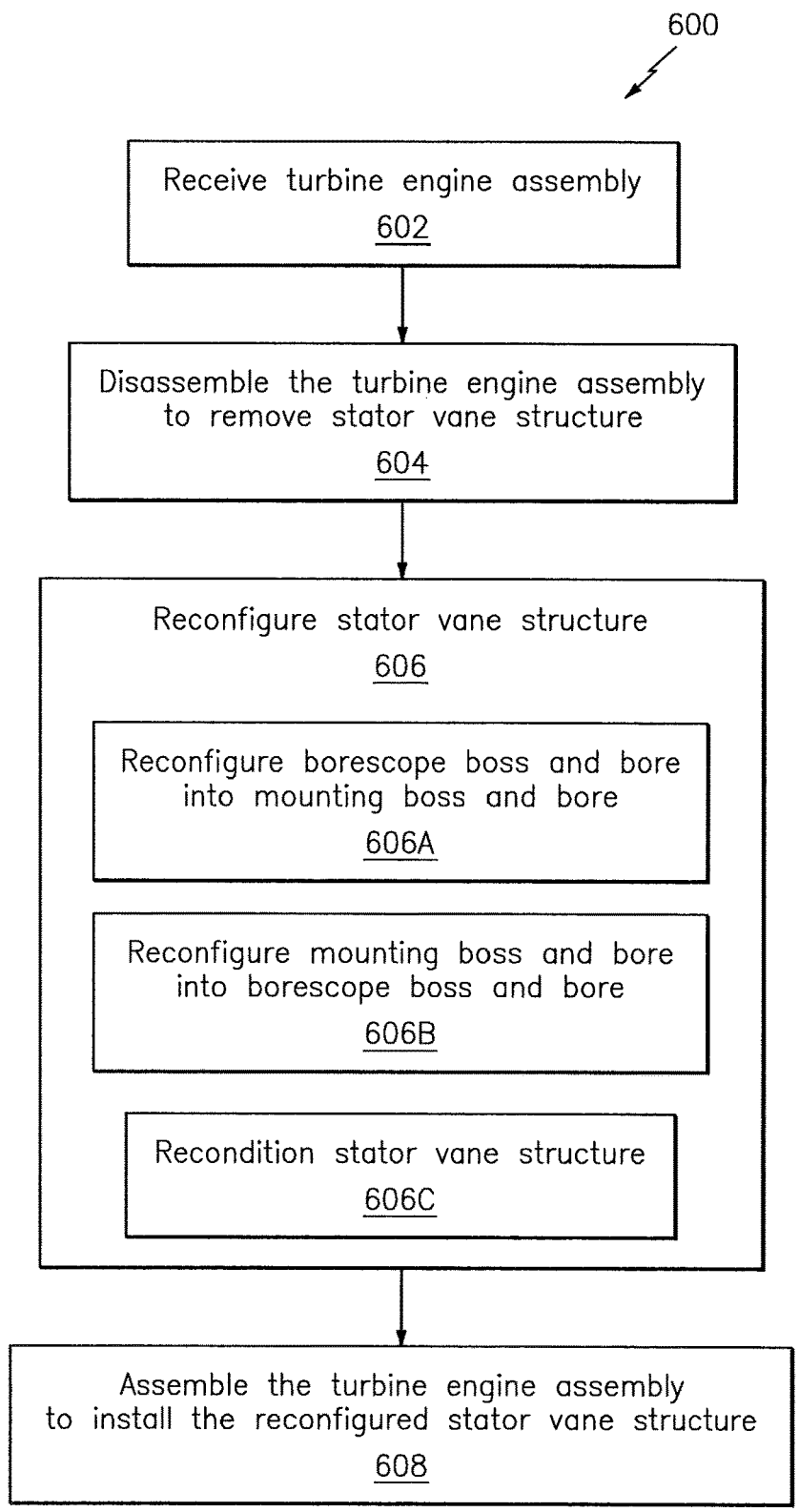
FIG. 6 is a method for overhauling/performing maintenance on a turbine engine assembly.

FIG. 6 illustrates a method 600 for overhauling/performing maintenance on a turbine engine assembly such as the turbine engine assembly 60 described above. In step 602, the turbine engine assembly 60 is received. A technician or technicians, for example, may disassemble the turbine engine 20 in order to access the turbine engine assembly 60. Alternatively, after being removed from the engine, the technician(s) may receive turbine engine assembly 60 by itself.

In step 604, the turbine engine assembly 60 is disassembled in order to remove the stator vane structure 64. The fastener devices 94 and the borescope plug 106, for example, may be removed such that the stator vane structure 64 may be axially removed from in between the inner case 34 and the stationary structure 62. Any struts, fluid conduits and/or electrical conduits configured with the turbine engine assembly 60 may also be disconnected and removed.

In step 606, the stator vane structure 64 is reconfigured. This reconfiguring includes a sub-step 606A (see FIGS. 7-9) of reconfiguring the borescope boss 74 and associated bore 114 into a mounting boss 72' and bore 100'. The reconfiguring also includes a sub-step 606B (see FIGS. 10-12) of reconfiguring one of the mounting bosses 72 and its associated bore 100 into a borescope boss 74' and bore 114'.

Figure 7:
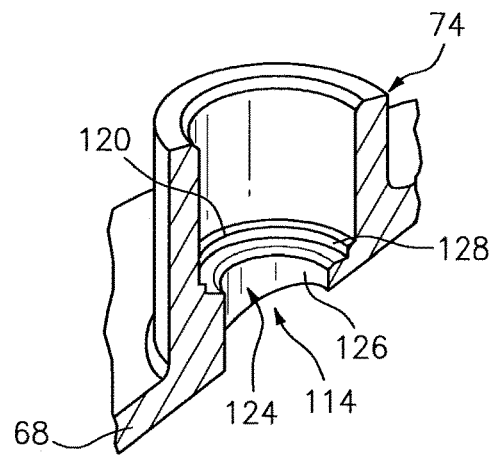
FIG. 7 is a perspective, side sectional illustration of a boss after being machined to change the geometry of its bore.

In the sub-step 606A, the borescope boss 74 and/or the outer platform 68 may be machined (e.g., drilled) to provide a plug aperture 124 as shown in FIG. 7. This plug aperture 124 may include a first portion 126 with a first diameter and a second portion 128 with a second diameter, which is greater than the first diameter. The first portion 126 may extend from the inner flow surface 90 to the second portion 128. The second portion 128 may extend from the first portion 126 to the shelf 120.

Figure 8:
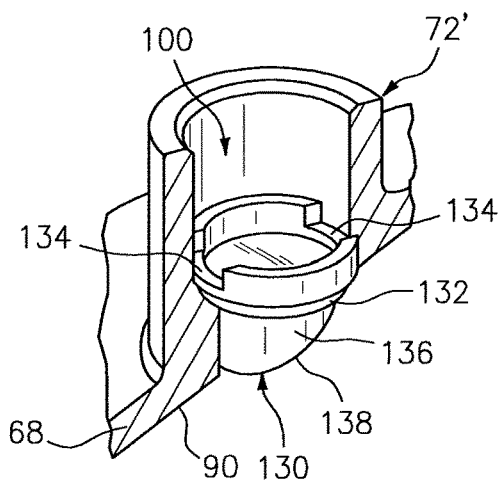
FIG. 8 is a perspective, side sectional illustration of the boss of FIG. 8 after being plugged.

Referring to FIG. 8, an aperture plug 130 is inserted into the plug aperture 124 and attached to the outer platform 68 in order to plug and, thereby, fluidly seal the bore 114 (see FIG. 7). In particular, the plug 130 includes a base portion 132 which is disposed within the second portion 128 of the plug aperture 124. The base portion 132 may be mechanically attached to the outer platform 68 and/or the borescope boss 74 by an interference fit. The base portion 132 may also or alternatively be bonded (e.g., tack welded, brazed, adhered, etc.) to the outer platform 68 and/or the borescope boss 74. The base portion 132 may also include one or more features 134 such as indentations and/or castellations for positioning the plug 130 within the plug aperture 124. These features 134 may also be utilized at a later date for removing the bushing 96; however, this plug 130 is generally fixed and not removable.

The plug 130 also includes a protrusion 136, which extend radially inward from the base portion 132 and partially projects into the first portion 126 of the plug aperture 124. This protrusion 136 may serve to further seal and plug the plug aperture 124. A distal end surface 138 of the plug 130 may be slightly radially recessed from the inner flow surface 90.

Figure 9:
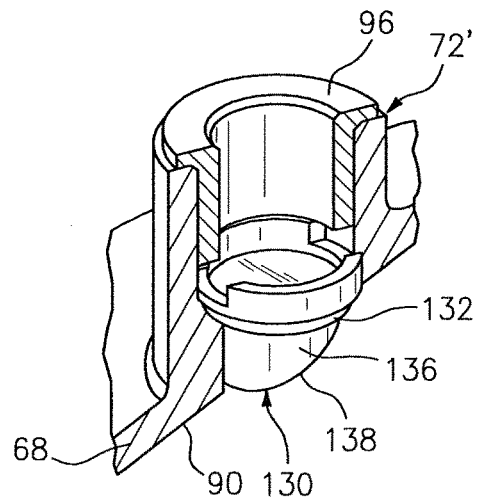
FIG. 9 is a perspective, side sectional illustration of the plugged boss of FIG. 8 configured with a bushing.

After plugging the bore 114, a bushing (e.g., 96) may be mated with the boss 72' as shown in FIG. 9. With this configuration, the borescope boss 74 and associated bore 114 are reconfigured substantially into a mounting boss 72' and associated bore 100'. The reconfigured boss 72' and bore 100' therefore have substantially the same geometry and, thus, functionality as each of the mounting bosses 72 and its respective bore 100.

Figure 10:
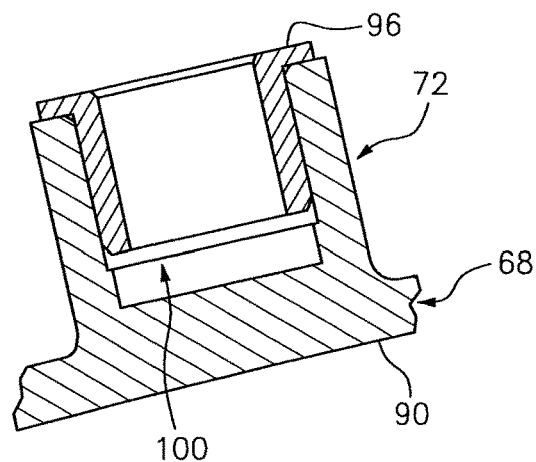
FIG. 10 is a perspective, side sectional illustration of another boss.
Figure 11:
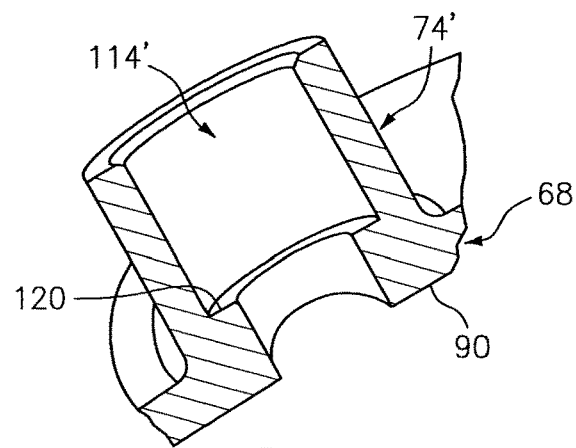
FIG. 11 is a perspective, side sectional illustration of the plugged boss of FIG. 10 after being machined to extend its bore through a platform.
Figure 12:
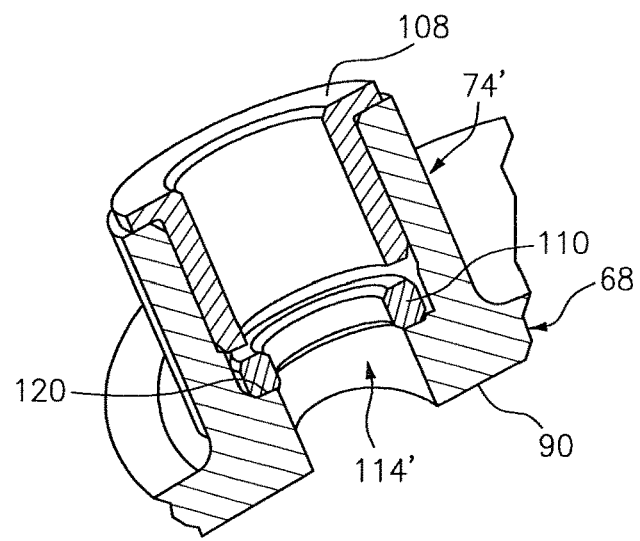
FIG. 12 is a perspective, side sectional illustration of the plugged boss of FIG. 10 configured with a seal and a bushing.

In the sub-step 606B, a select one of the mounting bosses 72 and/or the outer platform 68 are machined (e.g., drilled) to extend the respective bore 100 (now 114') radially through the outer platform 68 as shown in FIGS. 10-11. A seal (e.g., 110) may inserted into the bore 114' and abutted against an annular shelf 120 (see FIG. 12), which was formerly the distal end of the bore 100. A bushing (e.g., 108) may then be mated with the boss 74'. With this configuration, the selected mounting boss 72 and associated bore 100 are reconfigured substantially into a borescope boss 74' and associated bore 114'. The reconfigured boss 74' and bore 114' therefore have substantially the same geometry and, thus, functionality as the former (i.e., pre-plugged) borescope boss 74 and bore 114.

Figure 13:
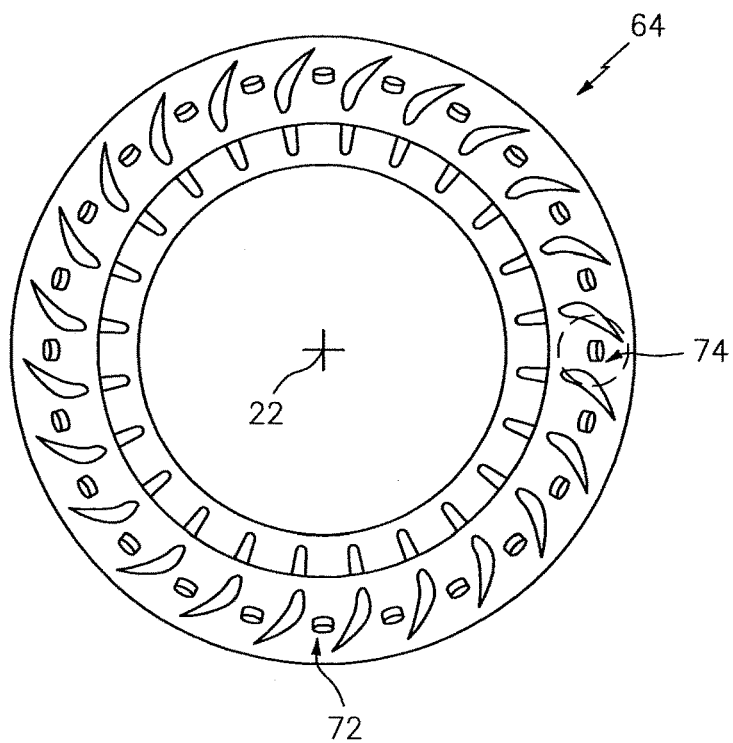
FIG. 13 is an end view illustration of the stator vane structure in a first orientation.
Figure 14:
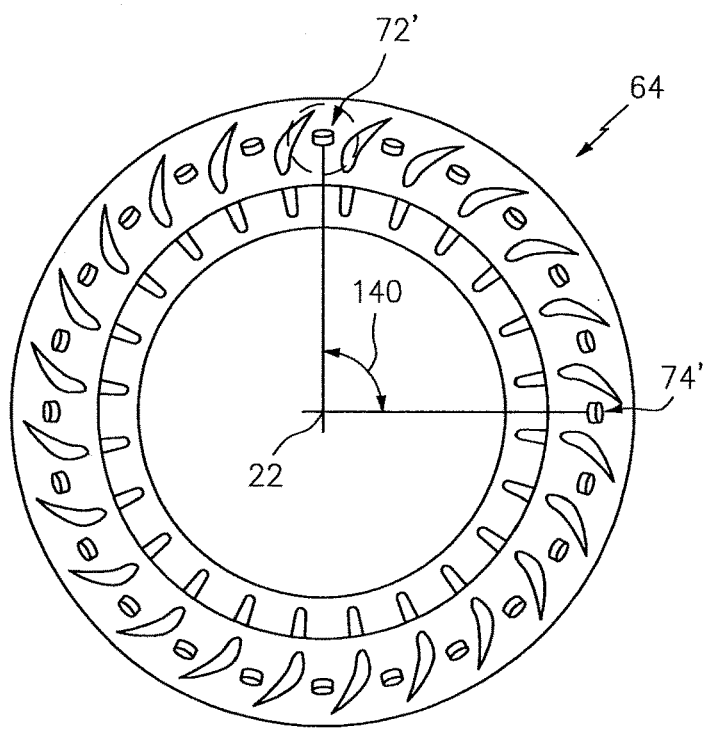
FIG. 14 is an end view illustration of a reconfigured stator vane structure in a second orientation.

By performing the foregoing sub-steps 606A and 606B, the stator vane structure 64 is reconfigured to be installed with the turbine engine assembly 60 at a new orientation. More particularly, whereas the stator vane structure 64 was originally at a first orientation before being removed in the step 604 (see FIG. 13), the stator vane structure 64 is now configured to being installed with the turbine engine assembly 60 at a second orientation (see FIG. 14). Note, FIGS. 13 and 14 are illustrated with a dotted circle which surrounds a boss and is kept stationary relative to the outer platform to better illustrate the change in orientation.

The second orientation is angularly displaced (e.g., rotationally clocked) about the centerline 22 by an angular displacement 140, which is equal to an angular displacement between the original borescope boss 74 and the new borescope boss 74'. The angular displacement 140 and, more particularly, the mounting boss 72 selected to be configured into the new borescope boss 74' in the step 606B may be selected based on various factors. Such factors may include, but are not limited to: the hot spot pattern within the core gas path 54; the pattern of deterioration to the stator vane assembly upon being removed; etc.

The angular displacement 140 between the first and the second orientations may be any angular displacement between zero degrees and three-hundred and sixty degrees (0°<displacement<360°). For example, in some embodiments, the angular displacement 140 between the first and the second orientations may be between about five degrees and about ninety degrees. In other embodiments, the angular displacement 140 between the first and the second orientations may be between about ninety degrees and about one-hundred and eighty degrees. In the exemplary method 600 of FIG. 6, the specific angular displacement is selected based on the angular displacements between the bosses 72 and 74 and/or the total number of bosses 72 and 74 where those bosses are uniformly displaced. For example, where there is a total of twenty-four bosses 72 and 74 as shown in FIGS. 13 and 14 and the designated boss 72 in FIG. 13 is reconfigured as the boss 74' in FIG. 14 (i.e., the boss 74 is moved six boss increments), the angular displacement is equal to about ninety degrees. The angular displacement therefore is here a multiple of an angular displacement increment, which is equal to three-hundred and sixty degrees divided by the total number of bosses 72 and 74. The present disclosure, of course, is not limited to the foregoing exemplary embodiments.

The reconfiguring of the step 606 may also include a sub-step 606C of reconditioning one or more portions of the stator vane structure 64. One or more portions/surfaces of the stator vane structure 64, for example, may be repaired, machined, heat treated, coated, recoated and/or otherwise worked/manipulated.

In step 608, the turbine engine assembly 60 is assembled in order to install the stator vane structure 64. The stator vane structure 64, for example, are axially inserted between the inner case 34 and the stationary structure 62 at the second orientation. The fastener devices 94 and the borescope plug 106 are then mated with the respective bosses 72, 72' and 74' to retain the stator vane structure 64. The struts, fluid conduits and/or electrical conduits, as applicable, may also be configured with and connected to the turbine engine assembly 60.

In some embodiments, the stator vane structure 64 may include at least one additional borescope boss and borescope plug. In such embodiments, this additional borescope boss may be relocated in a similar manner as described above.

The turbine engine assembly 60 may be included in various turbine engines other than the one described above. The turbine engine assembly 60, for example, may be included in a geared turbine engine where a gear train connects one or more shafts to one or more rotors in a fan section, a compressor section and/or any other engine section. Alternatively, the turbine engine assembly 60 may be included in a turbine engine configured without a gear train. The turbine engine assembly 60 may be included in a geared or non-geared turbine engine configured with a single spool, with two spools (e.g., see FIG. 1), or with more than two spools. The turbine engine may be configured as a turbofan engine, a turbojet engine, a propfan engine, a pusher fan engine or any other type of turbine engine. The present invention therefore is not limited to any particular types or configurations of turbine engines.

While various embodiments of the present invention have been disclosed, it will be apparent to those of ordinary skill in the art, that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method involving a turbine engine assembly, comprising:
    receiving the turbine engine assembly, the turbine engine assembly including an annular stator vane structure disposed at a first orientation; and
    reconfiguring the stator vane structure with the turbine engine assembly to be disposed at a second orientation;
    wherein the reconfiguring of the stator vane structure comprises:
        disassembling the turbine engine assembly to remove the stator vane structure;
        rotationally clocking the stator vane structure from the first orientation to the second orientation to provide a clocked stator vane structure; and
        assembling the turbine engine assembly to install the clocked stator vane structure; and
    wherein the reconfiguring of the stator vane structure further comprises plugging an aperture which extends radially through a platform of the stator vane structure.

2. The method of claim 1, wherein the second orientation is angularly displaced about an axial centerline of the turbine engine assembly from the first orientation by between five degrees and one-hundred and eighty degrees.

3. The method of claim 1, wherein
    the stator vane structure includes a plurality of bosses substantially uniformly disposed circumferentially about an axial centerline of the turbine engine assembly;
    each adjacent pair of the bosses are separated by an angular displacement increment about the axial centerline; and
    the second orientation is angularly displaced about the axial centerline from the first orientation by a multiple of the angular displacement increment.

4. The method of claim 1, wherein the second orientation is angularly displaced about an axial centerline of the turbine engine assembly from the first orientation to change a hot spot location on the stator vane structure.

5. The method of claim 1, wherein
    the turbine engine assembly includes a first turbine rotor and a second turbine rotor; and
    the stator vane structure is arranged between the first turbine rotor and the second turbine rotor.

6. The method of claim 1, wherein the reconfiguring of the stator vane structure further comprises reconditioning at least a portion of the stator vane structure.

7. The method of claim 1, wherein the plugging comprises inserting a plug into the aperture and attaching the plug to the platform by at least an interference fit.

8. The method of claim 1, wherein the plugging comprises inserting a plug into the aperture and attaching the plug to the platform by at least a bond joint.

9. The method of claim 1, wherein
    the plugging comprises inserting a plug into the aperture and attaching the plug to the platform;
    a flow surface of the plug is radially recessed from a corresponding flow surface of the platform; and
    the flow surface of the platform partially forms a gas path through the stator vane structure.

10. The method of claim 1, wherein
    the aperture is surrounded by a boss;
    the reconfiguring of the stator vane structure further comprises mating a bushing with the boss; and
    the assembling of the turbine engine assembly comprises inserting a retaining pin into the bushing radially outboard of the plug.

11. A method involving a turbine engine assembly, comprising:
    receiving the turbine engine assembly, the turbine engine assembly including an annular stator vane structure disposed at a first orientation; and reconfiguring the stator vane structure with the turbine engine assembly to be disposed at a second orientation;

wherein the reconfiguring of the stator vane structure comprises:
- disassembling the turbine engine assembly to remove the stator vane structure;
- rotationally clocking the stator vane structure from the first orientation to the second orientation to provide a clocked stator vane structure; and
- assembling the turbine engine assembly to install the clocked stator vane structure; and wherein the reconfiguring of the stator vane structure further comprises forming an aperture radially through a platform of the stator vane structure.

12. The method of claim 11, wherein the assembling of the turbine engine assembly comprises inserting a borescope plug into the aperture.

13. A method for overhauling a turbine engine assembly, comprising:
- receiving the turbine engine assembly, the turbine engine assembly extending along an axial centerline and including a first set of turbine blades, a second set of turbine blades and an annular stator vane structure, wherein the stator vane structure is axially between the first set of turbine blades and the second set of turbine blades and disposed at a first orientation;
- disassembling the turbine engine assembly to remove the stator vane structure;
- reconfiguring the stator vane structure to provide a reconfigured stator vane structure, the reconfiguring comprising:
  - plugging a first aperture that extends radially through an outer platform of the stator vane structure;
  - forming a second aperture radially through the outer platform, wherein the second aperture is angularly displaced about the axial centerline from the plugged first aperture by an angular displacement; and
- assembling the turbine engine assembly to install the reconfigured stator vane structure, wherein the reconfigured stator vane structure is disposed at a second orientation which is angularly displaced about the axial centerline from the first orientation by the angular displacement.

* * * * *